United States Patent
Shimizu et al.

(10) Patent No.: US 8,652,977 B2
(45) Date of Patent: Feb. 18, 2014

(54) HEAT-RESISTANT NONWOVEN FABRIC

(75) Inventors: Toshiyuki Shimizu, Tokyo (JP); Masahiko Maeda, Tokyo (JP)

(73) Assignee: Asahi Kasei Fibers Corporation, Osaka (JP)

( * ) Notice: Subject to any disclaimer, the term of this patent is extended or adjusted under 35 U.S.C. 154(b) by 676 days.

(21) Appl. No.: 12/442,350

(22) PCT Filed: Sep. 21, 2007

(86) PCT No.: PCT/JP2007/068425
§ 371 (c)(1),
(2), (4) Date: Mar. 20, 2009

(87) PCT Pub. No.: WO2008/035775
PCT Pub. Date: Mar. 27, 2008

(65) Prior Publication Data
US 2009/0253329 A1   Oct. 8, 2009

(30) Foreign Application Priority Data
Sep. 21, 2006   (JP) .................................. 2006-255778

(51) Int. Cl.
*D04H 3/16*   (2006.01)
*D04H 1/56*   (2006.01)
*B32B 5/26*   (2006.01)
*D04H 5/06*   (2006.01)

(52) U.S. Cl.
USPC ........... 442/401; 442/400; 442/381; 442/382; 442/409

(58) Field of Classification Search
USPC ................................................ 442/327–415
See application file for complete search history.

(56) References Cited

U.S. PATENT DOCUMENTS

| | | | |
|---|---|---|---|
| 4,950,529 A | | 8/1990 | Ikeda et al. |
| 5,405,695 A | * | 4/1995 | Akatsu et al. ................ 428/364 |
| 5,464,688 A | * | 11/1995 | Timmons et al. ............ 442/382 |
| 5,607,735 A | * | 3/1997 | Brown ......................... 428/36.1 |
| 6,583,072 B1 | * | 6/2003 | Kawakami et al. .......... 442/103 |
| 6,730,439 B2 | * | 5/2004 | Kamei et al. ................. 429/247 |
| 2006/0172639 A1 | * | 8/2006 | Yamada et al. ................ 442/59 |

FOREIGN PATENT DOCUMENTS

EP   1 637 317 A1   3/2006
JP   58 031112 A   2/1983
(Continued)

OTHER PUBLICATIONS

Textile Glossary definition of Spunbond, copyright 2001, Celanese Acetate.*

(Continued)

*Primary Examiner* — Jennifer A Steele
(74) *Attorney, Agent, or Firm* — Finnegan, Henderson, Farabow, Garrett & Dunner, L.L.P.

(57) ABSTRACT

The present invention provides a heat-resistant nonwoven fabric wherein the nonwoven fabric is formed from a poly(phenylene sulfide) fiber, and 30% by weight or more of the poly(phenylene sulfide) fiber has a crystallinity of 25 to 50%. Moreover, the properties of the heat-resistant nonwoven fabric can be further improved by making the nonwoven fabric have a multilayer structure in which layers composed of a poly(phenylene sulfide) filamentary fiber and layers composed of a poly(phenylene sulfide) fine fiber are stacked and integrated.

3 Claims, 1 Drawing Sheet

(56) References Cited

FOREIGN PATENT DOCUMENTS

| JP | 2-289161 | 11/1990 |
| JP | 05-230760 A | 9/1993 |
| JP | 7-26460 | 1/1995 |
| JP | 8-302549 | 11/1996 |
| JP | 2003-342382 | 12/2003 |
| WO | WO 2004/094136 | 11/2004 |

OTHER PUBLICATIONS

Office Action dated Jul. 14, 2010 from corresponding Chinese application.

Takeshi Kikutani et al., "Fiber Structure Formation in High-Speed Melt Spinning of Poly (Phenylene Sulfide)", Seni-I-Gakkaishi, vol. 48, No. 10 (1992) pp. 6-13.

Office Action dated Jun. 14, 2011 issued in the corresponding Japanese application.

* cited by examiner

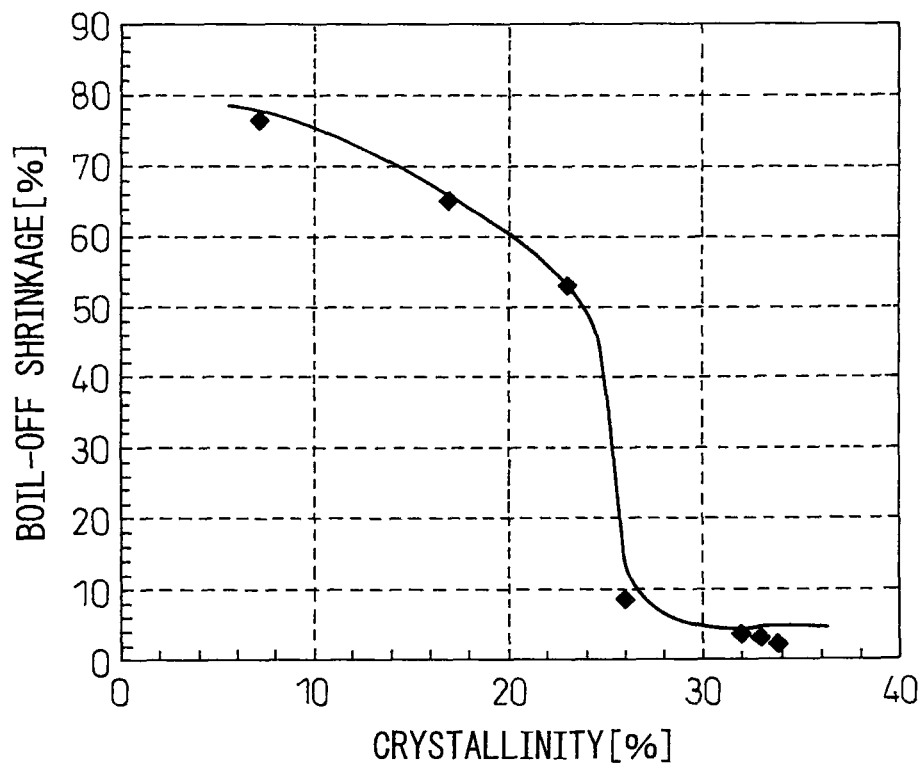

HEAT-RESISTANT NONWOVEN FABRIC

TECHNICAL FIELD

The present invention relates to a heat-resistant nonwoven fabric formed from a poly(phenylene sulfide) fiber.

BACKGROUND ART

A poly(phenylene sulfide) (hereinafter abbreviated to PPS) fiber has high heat resistance, wet heat resistance, chemical resistance and flame retardancy and is characterized in that the fiber can be used in a very harsh environment. A nonwoven fabric composed of a PPS fiber has been used for filters and bag filters for industrial chemicals, battery separators, and the like. In particular, the nonwoven fabric can desirably be used in a harsh environment requiring heat resistance and chemical resistance.

As fundamental properties, PPS has properties of withstanding such harsh environments. On the other hand, when PPS is shaped into a fibrous material and a nonwoven fabric is obtained therefrom, PPS has the problem that it shows poor dimensional stability against heat, and the problem that the fiber or nonwoven fabric shows a significant thermal shrinkage. For example, a PPS fiber nonwoven fabric prepared by melt blowing can be expected to have excellent filtering performance because the constituent fiber is thin. However, the nonwoven fabric has the problem that it has a low tensile strength and it shows poor dimensional stability against heat. Therefore, in order to obtain a PPS fiber nonwoven fabric that can be practically used, it has been necessary, after forming the nonwoven fabric, for the nonwoven fabric to be subjected to treatment for dimension stabilization against heat in the post step, so that the thermal shrinkage is lowered.

Various proposals for means for improving the dimensional stability against heat of a PPS fiber nonwoven fabric have been made.

For example, Japanese Unexamined Patent Publication (Kokai) No. 57-16954 discloses a method comprising treating a filamentary fiber web with needle punch, thermally shrinking the web to develop spiral crimps, and making the crimped web cohere to improve to improve dimensional stability against heat.

Japanese Unexamined Patent Publication (Kokai) No. 1-292161 discloses a method of making a non-crimped filamentary fiber nonmelting at temperatures up to 400° C. by melt bonding 30% or more of the filamentary fiber. Moreover, Japanese Unexamined Patent Publication (Kokai) No. 2005-154919 discloses a method comprising preparing a woven fabric from a PPS fiber, and biaxially stretching the woven fabric at temperatures of a glass transition temperature or more. However, because these methods require a heat-treating step, a step of making nonmelting or a stretching step, they have the problem that the production processes become complicated, and the production efficiencies are lowered so that the products are likely to become costly.

Furthermore, as methods of improving PPS raw materials, methods of improving the dimensional stability against heat of PPS by adding a branched polymer and a copolymer to the PPS are proposed (U.S. Pat. No. 4,458,189 and Japanese Patent Publication No. 2890470, and the like). However, the methods have the problem that the methods require special raw materials.

On the other hand, various methods of improving the dimensional stability against heat of the PPS fiber itself have been proposed. For example, a method of making PPS nonmelting by subjecting the polymer to oxidation treatment (Japanese Unexamined Patent Publication (Kokai) Nos. 63-182413 and 3-104923, and the like) is proposed. However, the method has the problem that the oxidation treatment makes the resultant fiber very brittle, and the problem that use of an oxidizing agent makes the production process complicated.

Moreover, Japanese Unexamined Patent Publication (Kokai) No. 58-31112 describes that the PPS fiber obtained by a high speed spinning technology has a crystallization temperature of less than 120° C. and a melting point of 285° C., and that it is excellent in heat resistance and dimensional stability. It is said that the crystalline portion having a high melting point of the PPS fiber becomes nuclei to improve the heat resistance and that the amorphous portion thereof contributes to the dimensional stability. However, the PPS fiber has the problem that the relationship between a fiber micro-structure and a crystallinity has not become definite, and the problem that the PPS fiber shows a large thermal shrinkage.

As explained above, none of the PPS fibers that have been proposed have been incapable of being used as fibers for spun-bonded nonwoven fabrics that are prepared by thermocompressive bonding fiber webs without further processing.

Therefore, development of a PPS fiber nonwoven fabric that can be stably produced by a simple production method with high productivity and an excellent economic efficiency and that shows an extremely decreased thermal shrinkage is desired.

DISCLOSURE OF THE INVENTION

Problems to Be Solved by the Invention

An object of the present invention is to provide a heat-resistant nonwoven fabric that requires no heat treatment for dimensional stabilization in the post-step after forming a nonwoven fabric, that is easily produced, and that is composed of a PPS fiber excellent in physical properties such as dimensional stability, heat resistance and chemical resistance.

Means for Solving the Problems

As a result of intensively carrying out investigations to solve the above problems, the present inventors have found that a PPS fiber having a crystallinity in a specific range and specific melting properties shows a decreased thermal shrinkage and is excellent in dimensional stability against heat. Moreover, they have also found that a nonwoven fabric formed from such a PPS fiber is excellent in dimensional stability against heat and has heat resistance, chemical resistance, flame retardancy, and the like.

The present inventors have also made investigations on making a nonwoven fabric have a multilayer structure. As a result, they have also found that, for example, a three layer-structure nonwoven fabric obtained by stacking and integrating an upper and a lower nonwoven fabric layer composed of a PPS fiber excellent in dimensional stability against heat and an intermediate layer composed of a PPS fine fiber that is obtained by melt-blowing process, or a two layer-structure nonwoven fabric obtained by stacking a PPS fine fiber obtained by melt-blowing process on a nonwoven fabric composed of a PPS fiber excellent in dimensional stability against heat has excellent filtering and barriering performance in addition to the above characteristics. The present invention has been achieved on the basis of the discoveries explained above.

That is, the present invention is described below.

1. A heat-resistant nonwoven fabric wherein the nonwoven fabric is formed from a PPS fiber, and 30% by weight or more of the PPS fiber has a crystallinity of 25 to 50%.

2. The heat-resistant nonwoven fabric according to 1 mentioned above, wherein the PPS fiber shows no melting peak in the temperature range of 85 to 240° C. when the melting peak is measured with a differential scanning calorimeter at a heating rate of 20° C./min.

3. The heat-resistant nonwoven fabric according to 1 or 2 mentioned above, wherein the PPS fiber is a filamentry fiber having a fiber diameter of 1 to 50 μm.

4. The heat-resistant nonwoven fabric according to any one of 1 to 3 mentioned above, wherein the nonwoven fabric is a spun-bonded nonwoven fabric that is integration bonded by thermal adhesion.

5. The heat-resistant nonwoven fabric according to 1 or 2 mentioned above, wherein one or more layers composed of a PPS filamentary fiber having a fiber diameter of 3 to 50 μm and a crystallinity of 25 to 50%, and one or more layers composed of a PPS fine fiber having a fiber diameter of 0.1 to 3 μm and a crystallinity of 10 to 50% are stacked and integrated to form the nonwoven fabric.

6. The heat-resistant nonwoven fabric according to 1 or 2 mentioned above, wherein the nonwoven fabric has as an upper and a lower layer layers each composed of a PPS filamentary fiber having a fiber diameter of 3 to 50 μm and a crystallinity of 25 to 50%, the nonwoven fabric also has as an intermediate layer a layer composed of a PPS fine fiber having a fiber diameter of 0.1 to 3 μm and a crystallinity of 10 to 50%, and the upper and the lower layer and the intermediate layer are stacked and integrated.

7. The heat-resistant nonwoven fabric according to any one of 1 to 6 mentioned above, wherein the shrinkage at 180° C. of the heat-resistant nonwoven fabric is 3% or less, and the tensile strength per unit fabric weight is 0.2 (N/cm)/(g/m$^2$) or more.

The present invention is explained below in detail.

The present invention provides a nonwoven fabric formed from a PPS fiber. The nonwoven fabric is a heat-resistant one maintaining heat resistance, chemical resistance and flame retardancy that are original properties of the PPS, and showing greatly improved dimensional stability against heat.

The heat-resistant nonwoven fabric of the present invention is formed from a PPS fiber, and 30% by weight or more of the PPS fiber forming the nonwoven fabric has a crystallinity of 25 to 50%. More preferably 40% by weight or more, particularly preferably 60% by weight or more of the PPS fiber forming the nonwoven fabric has a crystallinity of 25 to 50%.

When a PPS fiber having a crystallinity as relatively high as from 25 to 50% constitutes 30% by weight or more, preferably 40% by weight or more, particularly preferably 60% by weight or more of the fiber forming the nonwoven fabric, the effect of decreasing a thermal shrinkage by the PPS fiber itself that is highly crystalline greatly influences the nonwoven fabric. As a result, the nonwoven fabric as a whole comes to have a sufficient dimensional stability against heat.

A nonwoven fabric having an excellent dimensional stability against heat is obtained by using a PPS fiber having a relatively high crystallinity in layers, and making the nonwoven fabric have a multilayer structure.

For example, a multilayer-structure nonwoven fabric wherein layers of PPS fibers having a relatively high crystallinity are used as an upper and a lower layer, and a layer of a PPS fine fiber having a relatively low crystallinity is used as an intermediate layer, is a preferred embodiment of the present invention.

As a result of variously investigating the relationship between a crystallinity and a boil-off shrinkage of a PPS fiber, the present inventors have found that the boil-off shrinkage greatly depends on the crystallinity.

That is, as shown in FIG. 1, when the crystallinity of a PPS fiber is less than 25%, the boil-off shrinkage is as very large as 50% or more. However, the present inventors have found that when the crystallinity is larger than 25%, the boil-off shrinkage drastically lowers, and that when the crystallinity is 30% or more, the boil-off shrinkage becomes a few percentages. Accordingly, the boil-off shrinkage can be lowered, and the thermal shrinkage of the nonwoven fabric formed from the PPS fiber can be lowered by adjusting the crystallinity of the PPS fiber to a specific range.

The PPS fiber in an amount of 30% by weight or more in the heat-resistant nonwoven fabric of the present invention has a crystallinity of 25 to 50%, preferably 30 to 40%. When the crystallinity is less than 25%, the fiber itself shows a large thermal shrinkage, and the web is shrunk during thermal adhesion. As a result, a satisfactory nonwoven fabric cannot be obtained. When the crystallinity exceeds 50%, the thermal adhesion is lowered due to a high crystallinity, and a nonwoven fabric having a high strength cannot be obtained. In addition, the method of measuring the crystallinity is described later.

In order to adjust the crystallinity of a PPS fiber, the polymerization conditions, the spinning speed in a spinning step, and the heating and drawing conditions are made proper. In particular, a crystallinity in a specific range can be obtained by increasing the spinning speed and promoting drawing in a spinning portion. The method of adjusting a crystallinity has been found by the present inventors.

The fiber diameter of a PPS filamentary fiber in the present invention is preferably from 1 to 50 μm, more preferably from 1 to 30 μm, particularly preferably from 2 to 15 μm. When the fiber diameter is in the above range, a non-woven fabric having uniformity and a high strength is obtained.

In the present invention, the post-heat treatment conducted for dimensional stability against heat is not necessary. However, the heat-resistant nonwoven fabric of the invention can be subjected to treatment of dimensional stabilization against heat as long as the effect of the invention is not lost, so that the nonwoven fabric is further dimensionally stabilized against heat. The resultant heat-resistant nonwoven fabric is also in the scope of the present invention.

When a PPS fiber is subjected to treatment of dimensional stabilization against heat after formation of the fiber, the crystallinity of the fiber is improved by 20 to 50%, and excellent dimensional stability can be imparted thereto. The treatment of dimensional stabilization against heat of the PPS fiber is commonly conducted in a glass transition temperature range of the fiber of 85 to 240° C. for a sufficient time while lowering of the strength and elongation of the fiber are being taken into consideration.

However, because the dimensional stabilization treatment produces unstable crystals that melt at temperatures up to the melting point (285 to 300° C.) of the PPS fiber in accordance with the treatment temperature, the heat resistance the PPS polymer originally has cannot be effectively utilized. The treatment is therefore not preferred in view of the heat resistance.

In addition, unstable crystals are detected as a melting peak in the temperature range of 85 to 240° C. by measurement with a differential scanning calorimeter.

For example, when the treatment temperature is 160° C., the melting peak appears near 160° C.

Furthermore, as a result of carrying out the dimensional stabilization treatment, the problem that the thermal adhesion between fibers becomes poor and a nonwoven fabric having a high strength cannot be obtained is likely to arise.

In order to make the PPS fiber have a satisfactory heat resistance in the present invention, it is preferred that the melting peak thereof determined by a differential scanning calorimeter at a heating rate of 20° C./min do not exist in the temperature range of 85 to 240° C.

In the present invention, the PPS fiber that is characterized by a crystallinity and a melting peak in specific ranges is excellent in dimensional stability against heat and thermal adhesion as explained above for the following reasons. Because the PPS fiber has a crystallinity in a specific range, the cohesive energy density of the PPS molecules increases. As a result, the constraint force among the molecules increases, and shrinkage caused by thermal relaxation is hindered. Moreover, because the PPS fiber is not heat treated, the PPS fiber has a structure that has a suitable amount of an amorphous portion contributing to thermal adhesion.

The boil-off shrinkage of a PPS fiber in the present invention is preferably 20% or less, more preferably 10% or less, particularly preferably 5% or less.

The strength of a PPS fiber in the present invention is preferably 2 cN/dtex or more, more preferably 2.5 cN/dtex or more, particularly preferably 3 cN/dtex or more.

The PPS fiber in the present invention may be either a filamentary fiber or a staple fiber. However, a spun-bonded filamentary fiber is preferred in view of the production efficiency.

The heat-resistant nonwoven fabric of the present invention shows a shrinkage at 180° C. of preferably 3% or less, more preferably 1% or less, particularly preferably 0.5% or less. Moreover, the tensile strength per unit fabric weight is preferably 0.2 $(N/cm)/(g/m^2)$ or more, more preferably 0.4 $(N/cm)/(g/m^2)$ or more. When the shrinkage and the tensile strength of the nonwoven fabric are in the above ranges, the nonwoven fabric has excellent dimensional stability, strength, filtering performance and barriering performance.

Although there is no specific restriction on the structure of the heat-resistant nonwoven fabric of the present invention, examples of the nonwoven fabric include a spun-bonded nonwoven fabric, a SM-composite nonwoven fabric, a SMS-composite nonwoven fabric, a multilayer-structure nonwoven fabric having 4 layers or more and a short fiber nonwoven fabric. Of these nonwoven fabrics, a spun-bonded nonwoven fabric, a SM-stacked nonwoven fabric, a SMS-stacked nonwoven fabric and a multilayer-structure nonwoven fabric having 3 layers or more are preferred in view of the production efficiency and high functionality. In addition, S and M signifies spunbond and melt blow, respectively.

In the present invention, one or more layers of a web composed of a PPS fiber that has a crystallinity of 25 to 50%, and an upper and a lower layer composed of a PPS fiber that has a crystallinity of 25 to 50% are used, and a multilayer-structure nonwoven fabric is prepared by stacking and integrating the above layers and a layer composed of a fine fiber. The resultant multilayer-structure nonwoven fabric is a preferred embodiment in view of the dimensional stability, surface abrasion resistance, imparting strength and flexibility.

The following can be mentioned as preferred embodiments of the multilayer-structure nonwoven fabric.

(i) A multilayer-structure nonwoven fabric in which one or more layers composed of a PPS filamentary fiber having a fiber diameter of 3 to 50 μm and a crystallinity of 25 to 50% and one or more layers composed of a PPS fine fiber having a fiber diameter of 0.1 to 3 m and a crystallinity of 10 to 50% are stacked and integrated.

(ii) A multilayer-structure nonwoven fabric which has, as an upper and a lower layer, layers composed of a PPS filamentary fiber having a fiber diameter of 3 to 50 μm and a crystallinity of 25 to 50%, which also has, as an intermediate layer, a layer composed of a PPS fine fiber having a fiber diameter of 0.1 to 3 μm and a crystallinity of 10 to 50%, and in which the upper and the lower layer and the intermediate layer are stacked and integrated.

For the multilayer-structure nonwoven fabric, the fiber diameter of the PPS filamentary fiber is preferably from 3 to 50 μm and the crystallinity thereof is preferably from 25 to 50%.

For the multilayer-structure nonwoven fabric, the fiber diameter of the PPS fine fiber is preferably from 0.1 to 3 μm, more preferably from 0.2 to 3 μm, particularly preferably from 0.3 to 3 μm. Such a PPS fine fiber can be easily produced by the melt-blowing process, or the like, described in Japanese Examined Patent Publication (Kokoku) No. 3-80905.

Furthermore, the fine fiber layer to be stacked may be a single layer, or a plurality of layers may also be stacked. The fiber diameter of the PPS fine fiber is suitably selected in the above-mentioned range, depending on the fiber diameter of the nonwoven fabric to be used as a base material, and the application of the nonwoven fabric. When the fiber diameter is from 0.1 to 3 μm, good filtering and barriering performance can be obtained.

Although examples of the bonding method of the heat-resistant nonwoven fabric of the invention include a thermal adhesion method, a hydroentanglement bonding and a needle punching bonding, a thermal adhesion method is preferred in view of the production efficiency. Moreover, the thermal adhesion may be conducted in area bonding or point bonding.

The PPS fiber in the fine fiber layer of the multilayer-structure nonwoven fabric has a crystallinity of preferably 10 to 50%, more preferably 15 to 30%.

When the crystallinity is less than 10%, the softening point of the fine fiber layer lowers. As a result, the fine fiber bleeds from the filamentary fiber layer sometimes during the thermal adhesion step. Therefore, the problem that the fiber of the intermediate layer sticks to the thermocompressive roll and stable production of the nonwoven fabric cannot be conducted is likely to arise. When the crystallinity exceeds 50%, the thermal adhesion force between the intermediate layer and the upper and the lower layer is likely to lower, and peeling between layers of the multilayer structure is likely to take place. Moreover, the strength of the multilayer-structure nonwoven fabric tends to lower.

Next, production of a PPS nonwoven fabric by spun bonding is explained below as one embodiment of the process for producing a heat-resistant nonwoven fabric of the invention.

The viscosity of the PPS polymer, namely, the melt flow rate (MFR) thereof determined at 315.6° C. with a load of 5 kg, in accordance with ASTM D1238-82 is preferably from 10 to 700 g/10 min, more preferably from 50 to 500 g/10 min. Moreover, the PPS polymer is preferably linear type.

When the MFR is in the above range, a spinning performance during fiber formation in the spinning step is excellent, and fiber breakage occurs less. Moreover, because the molecular weight of the PPS polymer is sufficiently high, a fiber having a sufficient practical strength is obtained. Furthermore, optional additives such as mass-coloring agents, titanium oxide, UV absorbers, thermal stabilizing agents and antioxidants may be added to the PPS polymer as long as the effect of the invention is not hindered.

One embodiment of the spinning step is explained below. A PPS polymer is melted with a conventional extruder, and the molten material is fed through a metering pump to a spinneret having many fine nozzles at a temperature of 300 to 380° C. The molten material is then extruded to form undrawn filaments, and the undrawn filaments are drawn with a drawing apparatus (e.g., an ejector apparatus) to give a PPS fiber web. The PPS fiber web that has not been subjected to dimensional stabilization treatment is subjected to continuous thermal adhesion with a thermocompressive roll to be integration bonded, and a heat-resistant nonwoven fabric of the invention is obtained.

The spinning temperature during melt spinning is preferably from 290 to 380° C., more preferably from 300 to 370° C., particularly preferably from 300 to 340° C. When the spinning temperature is in the above range, the molten state is stabilized, and a fiber having a satisfactory strength is obtained without unevenness and coloring. There is no specific limitation on the cross section shape of the spinning nozzle, and one having a circular, a triangular, a polygonal, a flat rectangle, or the like shape can be employed. Usually, a circular nozzle having a nozzle diameter of about 0.1 to 1.0 mm is preferred.

The molten polymer extruded through the nozzles at a predetermined spinning temperature is ejected from the exit of the ejector apparatus in combination with an air stream to form a group of drawn filaments, which are collected as a web on a movable porous receiver (such as a metal-made or resin made net-like material running at a constant speed) provided below the ejector apparatus.

The ejector apparatus herein designates an apparatus which draws molten spun filaments at high speed with a high speed air stream that is formed by compressed air and utilized as a driving force to attenuate the filaments, and which has a function of making the filaments accompany the high speed air stream. The speed of the filaments extruded through the ejector, namely, the spinning speed is an index of thinning a single filament. When the spinning speed is made higher, the single filament is made thinner, and a fiber more excellent in strength and dimensional stability is obtained.

The spinning speed is preferably from 6,000 to 15,000 m/min. When the spinning speed is less than 6,000 m/min, the filaments are not sufficiently drawn. As a result, the strength and the dimensional stability against heat of the filaments become insufficient. Moreover, the web shrinks sometimes during thermal adhesion. When the spinning speed is from 6,000 to 15,000 m/min, the crystallinity becomes from 25 to 50%, and a nonwoven fabric of high quality excellent in strength and dimensional stability against heat can be stably obtained.

During spinning filaments, the following tendencies are sometimes observed: a group of filaments ejected from an ejector are likely to gather tightly, and the spread of the web collected is narrow; and the web cannot have preferable uniformity and appearance as a sheet. In such a case, designing the ejector so that filaments are ejected while mutually being apart from each other, and collected is particularly effective in solving the problem.

In order to realize the above designing, the following methods, for example, can be employed: an impact member is provided below the ejector so that the filaments collide with the impact member, and as a result the filaments are frictionally charged and opened; the filaments are forcibly charged and opened below the ejector by corona discharge.

During collecting a web, an air stream that accompanies a group of filaments strikes a receiver, and sometimes blows the web once deposited to make the web disorder. In order to prevent such a phenomenon, it is preferred to employ means for sucking the air from the lower portion of the receiver. A PPS filamentary fiber may be used in a single layer, or a plurality of PPS fiber layers may be stacked and used.

Next, one embodiment of a process for producing a multilayer-structure nonwoven fabric of the heat-resistant nonwoven fabric in the present invention is explained below.

A layer composed of a PPS filamentary fiber is produced by the above spunbonding method.

The fiber diameter and the crystallinity of a PPS fine fiber to be stacked can be adjusted to given ranges, for example, using a PPS polymer showing a melt flow rate (MFR) of 100 to 1,000 (g110 min) determined in accordance with ASTM D1238-82 at a temperature of 315.6° C. with a load of 5 kg and conventionally melt blowing the polymer.

The multilayer-structure nonwoven fabric is obtained by stacking a layer composed of a PPS filamentary fiber and a layer composed of a PPS fine fiber, and integrating the stacked layers. Moreover, when a PPS fine fiber produced by the melt-blowing process is stacked on a layer composed of a PPS filamentary fiber by direct blowing, peeling between layers is prevented due to the effect of intrusion of the fine fiber into the filamentary fiber layer, and the filamentary fiber layer is strengthened. The procedure is therefore preferred because a high strength nonwoven fabric is obtained.

The heat-resistant nonwoven fabric of the present invention can be obtained by integration bonding the webs thus obtained as explained above, through continuous thermal adhesion. The thermal adhesion is preferably conducted at heating temperatures of 200 to 270° C. with a compressive bonding area ratio of 3% or more. Excellent adhesion among the fibers can be attained by the thermal adhesion. In this case, the thermal adhesion is effected by instantaneously imparting a heat for a short period of time, and the thermal adhesion does not change the crystal structure of the PPS fiber.

Although the thermal adhesion may be conducted by thermocompressive bonding with a heated flat plate, a method of thermocompressive bonding by passing webs between a pair of calendar rolls is preferred because the productivity is excellent. The temperature and pressure of the calendar rolls should be suitably selected while the basis weight, the speed, and the like, of the supplied webs are being taken into consideration, and cannot be determined unilaterally. However, in order to improve the strength of the nonwoven fabric thus obtained, the following are preferred: a thermocompression temperature of 210 to 260° C.; a compressive bonding area ratio of 3% or more; and a thermocompression line pressure of 50 N/cm or more.

A calendar roll which has a smooth surface, or on which patterns (such as rectangular patterns, pinpoint patterns, weave texture patterns, Y patterns, dungarees patterns, herringbone patterns, quadrangle patterns, lateral lozenge splashed patterns and oblique splashed patterns) are engraved may be used. Alternatively, a plurality of rotating rollers in which rollers of the same type or different types are combined may also be used. In order to make the nonwoven fabric exhibit an excellent strength, a ratio of the thermally bonded area is preferably 3% or more based on the entire area of the nonwoven fabric.

Effect of Invention

In the present invention, the thermal shrinkage of a PPS fiber itself can be made low by making the crystallinity of the PPS fiber fall within a specific range. As a result, the thermal shrinkage of a nonwoven fabric composed of the PPS fiber can be greatly decreased. For example, a spun-bonded nonwoven fabric formed from a PPS filamentary fiber having a crystallinity of 30% shows a dry heat shrinkage of 0.1% at 180° C. That is, the spun-bonded nonwoven fabric shows an extremely excellent dimensional stabilization effect.

The crystallinity of a PPS fiber can be adjusted to fall in a specific range by drawing the PPS fiber under appropriate conditions in the spinning step. Therefore, an excellent effect can be obtained with a simple apparatus, and practice of the present invention is extremely economical in the production of such a nonwoven fabric.

Moreover, in the present invention, the filtering performance of a nonwoven fabric composed of a PPS fiber can be further improved by making the nonwoven fabric have a multilayer structure. For example, a multilayer structure such as a SMS stacked layer nonwoven fabric (spun-bonded (S) layer/melt-blown (M) layer/spun-bonded (S) layer) can be applied to the nonwoven fabric of the invention. The tensile strength, the barriering performance, and the like, in addition to the filtering performance, of the nonwoven fabric of the invention can be varied by variously changing the multilayer structure.

BRIEF DESCRIPTION OF THE DRAWING

FIG. 1 is a graph showing the relationship between a boil-off shrinkage and a crystallinity of a PPS fiber.

BEST MODE FOR CARRYING OUT THE INVENTION

The present invention is further explained below by making reference to examples. However, the present invention is in no way restricted thereto.

In addition, the measurement methods, evaluation methods, and the like are as described below.
(1) Measurement of Melt Flow Rate (MFR)

The melt flow rate is measured in accordance with ASTM D1238-82, at a load of 5 kg at a temperature of 315.6° C. The melt flow rate is expressed in g/10 min.
(2) Measurement of Fiber Diameter Randomly selected 10 sites of a sample are microscopically photographed at a magnification of ×2500, and the fiber diameter at 50 points are determined, followed by obtaining the average value of the determined diameters.
(3) Measurement of Single Filament Tenacity Using a tensile testing machine, the stress-elongation curve of a sample 100 mm long is obtained at a pulling rate of 200 mm/min, and the single filament tenacity (cN/dtex) is obtained by dividing the maximum stress by the fineness (dtex) of the sample.
(4) Measurement of Crystallinity Using a differential scanning calorimeter (TA Instruments, Inc., DSC2920), 5.0 mg of a sample is measured under the conditions mentioned below, and the crystallinity (%) is calculated. In addition, the heat of melting of a perfect crystal of 146.2 J/g is used.

Measurement atmosphere: a nitrogen gas flow of 150 ml/min, and a heating rate of 20° C./min Measurement range: 30 to 350° C.

$$\text{Crystallinity} = \{[(\text{heat of melting [J/g]}) - (\text{heat of cold crystallization [J/g]})]/146.2\} \times 100$$

(5) Measurement of Melting Peak

Using a differential scanning calorimeter (TA Instruments, Inc., DSC2920), 5.0 mg of a sample is measured under the conditions mentioned below, and the melting peak is determined.

Measurement atmosphere: a nitrogen gas flow of 150 ml/min, and a heating rate of 20° C./min Measurement range: 30 to 350° C.

(6) Boil-Off Shrinkage

The boil-off shrinkage (%) is calculated from the following formula $$\text{boil-off shrinkage} = \{(L_0 - L_1)/L_0\} \times 100$$

wherein $L_0$ is a length of a sample measured while a load corresponding to 0.05 cN/dtex is being applied, and $L_1$ is a length of the sample while the above load is being applied again after immersing the sample in boiling water for 3 minutes without tension and taking out the sample therefrom.
(7) Measurement of Basis Weight (g/m$^2$) of Nonwoven Fabric The basis weight of a nonwoven fabric is determined in accordance with JIS L-1906.
(8) Measurement of Tensile Strength of Nonwoven Fabric The tensile strength of a nonwoven fabric is determined in accordance with JIS L-1906, and the average value of a tensile strength in the MD direction and one in the CD direction is defined as the tensile strength of the nonwoven fabric. The tensile strength is expressed in (N/cm)/(g/m$^2$) (numerical value of tensile strength per unit fabric weight).
(9) Measurement of Dry Heat Shrinkage of Nonwoven Fabric Using a hot-air oven (ESPEC CORP: HIGH-TEMP OVEN PHH-300), 3 samples (10 cm×10 cm) are exposed to a hot air atmosphere at 180° C. for 30 minutes, and the area shrinkage (%) of the nonwoven fabric is determined.

Example 1

A linear PPS polymer (manufactured by Polyplastics: Fortron) showing a melt flow rate (MFR) of 70 g/10 min was melted at 320° C., and extruded through a spinneret having a nozzle-diameter of 0.25 mm. The extruded fiber was drawn at a spinning speed of 7,000 m/min while being sucked with an ejector, and the drawn fiber was collected and deposited on a moving porous conveyor belt to give a PPS filamentary fiber web.

The web thus obtained was subjected to partial thermocompressive bonding with a line pressure of 300 N/cm between a weave texture pattern emboss (compressive bonding area ratio of 14.4%) heated at 250° C. and a flat roll to give a heat-resistant nonwoven fabric. Table 1 shows the properties of the fiber forming the nonwoven fabric and those of the nonwoven fabric. In addition, the PPS fiber had no melting peak in the temperature range of 85 to 240° C.

Examples 2 and 3

Heat-resistant nonwoven fabrics were prepared in the same manner as in Example 1 except that the spinning speed was set at 8,000 m/min (Example 2) or 11,000 m/min (Example 3). Table 1 shows the properties of fibers forming the nonwoven fabrics and those of the nonwoven fabrics. In addition, the PPS fibers had no melting peak in the temperature range of 85 to 240° C.

Example 4

A linear PPS polymer (manufactured by Polyplastics: Fortron) showing a melt flow rate (MFR) of 70 g/10 min was melted at 320° C., and extruded through a spinneret having a nozzle diameter of 0.25 mm. The extruded fiber was drawn at a spinning speed of 8,000 m/min while being sucked with an ejector, and the drawn fiber was collected and deposited on a moving porous conveyor belt to give a PPS filamentary fiber web having a basis weight of 30 g/m².

Next, a linear PPS polymer (manufactured by Polyplastics: Fortron) showing a melt flow rate (MFR) of 670 g/10 min was spun by melt-blowing process at a spinning temperature of 340° C. and a heating air temperature of 390° C. to give a fine fiber having an average fiber diameter of 0.7 µm. The fine fiber was vertically ejected toward the PPS filamentary fiber web prepared above, as a random web having a basis weight of 10 g/min to give stacked webs composed of a fine fiber layer and a filamentary fiber layer. In addition, the upper face of the filamentary fiber web was 100 mm apart from the melt blowing nozzles.

A PPS filamentary fiber web is opened in the same manner as mentioned above on the fine fiber layer of the stacked webs thus obtained to give three layer stacked webs composed of a filamentary fiber layer, a fine fiber layer and a filamentary fiber layer.

The three-layer stacked webs were subjected to partial thermocompressive bonding with a line pressure of 300 N/cm between a weave texture pattern emboss (compressive bonding area ratio of 14.4%) roll heated at 250° C. and a flat roll to give a heat-resistant nonwoven fabric having a multilayer structure. Table 1 shows the properties of fibers forming the nonwoven fabric and those of the nonwoven fabric. In addition, the PPS filamentary fiber had no melting peak in the temperature range of 85 to 240° C.

Comparative Example 1

A PPS filamentary fiber web was prepared under the same conditions in Example 1 except that the spinning speed was set at 5,000 m/min. The resultant web was subjected to thermocompressive bonding between a weave texture pattern emboss (compressive bonding area ratio of 14.4%) roll heated at 260° C. and a flat roll with a line pressure of 300 N/cm. However, the thermal shrinkage was significant, and a satisfactory heat-resistant nonwoven fabric was not obtained.

INDUSTRIAL APPLICABILITY

Because the heat-resistant nonwoven fabric of the present invention is excellent in physical properties such as dimensional stability, heat resistance, chemical resistance, flame retardancy and strength, the nonwoven fabric can be widely used not only for general industrial materials, flame-retardant covering materials, and the like, but also in applications in which polyester-based, polyamide-based and polyolefin-based stacked nonwoven fabrics cannot be used. The nonwoven fabric of the invention is particularly suitable for applications such as filter-related ones and battery separators that require chemical resistance and heat resistance.

Furthermore, the tensile strength, filtering performance and barriering performance of the nonwoven fabric of the invention can be further improved by making it have a multilayer structure.

The invention claimed is:

1. A heat-resistant nonwoven fabric wherein the nonwoven fabric is formed from a poly(phenylene sulfide) fiber, the poly(phenylene sulfide) fiber has a crystallinity of 25 to 50%, the poly(phenylene sulfide) fiber is a filamentary fiber having a fiber diameter of 1 to 30 µm, the poly(phenylene sulfide) fiber shows no melting peak in the temperature range of 85 to 240° C. when the melting peak is measured with a differential scanning calorimeter at a heating rate of 20° C./min, the nonwoven fabric is a spun-bonded nonwoven fabric that is integration bonded by thermal adhesion, the shrinkage at 180° C. of the heat-resistant nonwoven fabric is 3% or less and the tensile strength per unit fabric weight is 0.2 (N/cm)/(g/m²) or more, and wherein the nonwoven fabric has not been subjected to treatment of dimensional stabilization against heat.

2. The heat-resistant nonwoven fabric comprising one or more layers of the nonwoven fabric formed from a poly(phenylene sulfide) fiber having a fiber diameter of 1 to 30 µm according to claim 1, and one or more layers composed of a poly(phenylene sulfide) fine fiber having a fiber diameter of 0.1 to 3 µm and a crystallinity of 10 to 50%, wherein these layers are stacked and integrated to form the heat-resistant nonwoven fabric.

TABLE 1

| | Fibers forming nonwoven fabric | | | | | | |
|---|---|---|---|---|---|---|---|
| | Filamentary fiber layer | | | | | Fine fiber layer | |
| | Spinning rate m/min | Fiber diameter µm | Strength cN/dtex | Crystallinity % | Boil-off shrinkage % | Melting peak °C. | Fiber diameter µm | Crystallinity % |
| Ex. 1 | 7000 | 8.1 | 3.2 | 32.0 | 3.6 | 299 | — | — |
| Ex. 2 | 8000 | 7.6 | 3.1 | 33.3 | 3.2 | 299 | — | — |
| Ex. 3 | 11000 | 6.5 | 3.0 | 33.8 | 2.4 | 300 | — | — |
| Ex. 4 | 8000 | 7.6 | 3.1 | 30.3 | 3.2 | 299 | 0.7 | 16.9 |
| Comp. Ex. 1 | 5000 | 9.7 | 1.1 | 11.7 | 60.9 | — | — | — |

| | Properties of nonwoven fabric | | | |
|---|---|---|---|---|
| | Basis weight g/cm² | Tensile strength (N/cm)/(g/m²) | Dry heat shrinkage % | |
| Ex. 1 | 70 | 0.57 | 0.1 | Excellent thermal adhesion |
| Ex. 2 | 70 | 0.60 | 0.1 | Excellent thermal adhesion |
| Ex. 3 | 70 | 0.66 | 0.1 | Excellent thermal adhesion |
| Ex. 4 | 70 | 0.63 | 0.1 | Excellent thermal adhesion |
| Comp. Ex. 1 | — | — | — | Satisfactory nonwoven fabric was not obtained due to thermal shrinkage |

3. A heat-resistant nonwoven fabric comprising, as an upper layer and a lower layer, a layer of the nonwoven fabric formed from a poly(phenylene sulfide) fiber having a fiber diameter of 1 to 30 μm according to claim 1, respectively, and, as an intermediate layer, a layer composed of a poly(phenylene sulfide) fine fiber having a fiber diameter of 0.1 to 3 μm and a crystallinity of 10 to 50%, wherein the upper and the lower layers and the intermediate layer are stacked and integrated to form the heat-resistant nonwoven fabric.

* * * * *

UNITED STATES PATENT AND TRADEMARK OFFICE
CERTIFICATE OF CORRECTION

| | | |
|---|---|---|
| PATENT NO. | : 8,652,977 B2 | Page 1 of 1 |
| APPLICATION NO. | : 12/442350 | |
| DATED | : February 18, 2014 | |
| INVENTOR(S) | : Shimizu et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 781 days.

Signed and Sealed this
Twenty-first Day of July, 2015

Michelle K. Lee
*Director of the United States Patent and Trademark Office*